(12) United States Patent
Chu et al.

(10) Patent No.: US 7,821,750 B2
(45) Date of Patent: Oct. 26, 2010

(54) VOLTAGE CONVERTER FOR PREVENTING SWITCH DEVICE FROM BEING DAMAGED BY VOLTAGE SPIKE BY UTILIZING PROTECTION CIRCUIT

(75) Inventors: Yi-Shan Chu, Hsin-Chu (TW); Ming-Nan Chuang, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 782 days.

(21) Appl. No.: 11/468,765

(22) Filed: Aug. 30, 2006

(65) Prior Publication Data
US 2008/0055796 A1 Mar. 6, 2008

(51) Int. Cl.
*H02H 7/10* (2006.01)
(52) U.S. Cl. .......................................... 361/18
(58) Field of Classification Search .................. 361/18
See application file for complete search history.

(56) References Cited
U.S. PATENT DOCUMENTS

| | | | | |
|---|---|---|---|---|
| 4,672,303 A | * | 6/1987 | Newton | 323/285 |
| 5,233,287 A | * | 8/1993 | Lenk | 323/268 |
| 5,315,496 A | * | 5/1994 | Okochi et al. | 363/21.02 |
| 5,973,367 A | * | 10/1999 | Williams | 257/365 |
| 6,930,473 B2 | * | 8/2005 | Elbanhawy | 323/282 |
| 2004/0090726 A1 | * | 5/2004 | Ball | 361/93.9 |
| 2005/0259448 A1 | * | 11/2005 | Koike | 363/21.01 |
| 2005/0275393 A1 | * | 12/2005 | Knoedgen et al. | 323/284 |
| 2006/0007714 A1 | * | 1/2006 | Hua | 363/24 |
| 2006/0226820 A1 | * | 10/2006 | Farkas | 323/276 |

FOREIGN PATENT DOCUMENTS

JP 9-322391 12/1997

* cited by examiner

*Primary Examiner*—Jared J Fureman
*Assistant Examiner*—Nicholas Ieva
(74) *Attorney, Agent, or Firm*—Winston Hsu; Scott Margo; Min-Lee Teng

(57) ABSTRACT

A voltage converter includes an electronic induction device, a switch device, a protection circuit, and a control circuit. The switch device, electrically connected to the electronic induction device, is utilized for selectively establishing an electrical connection between the electronic induction device and a predetermined voltage level according to a control signal. The protection circuit, coupled to the electronic induction device, is utilized for selectively establishing an electrical connection between the electronic induction device and the predetermined voltage level, wherein the protection circuit is enabled to establish the electrical connection when a current passing through the switch device exceeds a predetermined current limit. The control circuit, coupled to the switch device, is utilized for generating the control signal.

8 Claims, 5 Drawing Sheets

VOLTAGE CONVERTER FOR PREVENTING SWITCH DEVICE FROM BEING DAMAGED BY VOLTAGE SPIKE BY UTILIZING PROTECTION CIRCUIT

BACKGROUND OF THE INVENTION

1. Field of the Invention

The present invention relates to a voltage converter, and more particularly, to a DC/DC voltage converter capable of minimizing the voltage spike efficiently by utilizing a protection circuit.

2. Description of the Prior Art

Please refer to FIG. 1. FIG. 1 is a diagram of an example of a prior art flyback DC/DC voltage converter 100. As shown in FIG. 1, the voltage converter 100 comprises an electronic induction device 105, a switch device 110, a control circuit 115, and an over-current detection circuit 120. The electronic induction device 105 has a diode D, a first electronic induction circuit $L_1$, and a second electronic induction circuit $L_2$, wherein the diode D acts as a rectifier to allow one-way current flow, and the first electronic induction circuit $L_1$ and second electronic induction circuit $L_2$ are implemented by coupling inductors or transformer and utilized for converting an input voltage signal $V_{in}$ into an output voltage signal $V_{out}$. The switch device 110 comprises a transistor $Q_1$ that will be selectively turned on/off by a first control signal $S_{c1}$ generated from the control circuit 115. The control circuit 115 comprises a plurality of resistors $R_1$, $R_2$ serving as a feedback path, an error amplifier $OP_1$, a PWM control loop 125, and a driver 130. The feedback voltage $$V_{fb}\left(V_{fb} = V_{out} \times \frac{R_2}{R_1 + R_2}\right)$$

is compared with a reference voltage $V_{ref1}$ by the error amplifier $OP_1$, and then the resultant output is fed into the following PWM control loop 125. The driver 130 drives the transistor $Q_1$ using a control signal $S_{c1}$. The PWM control loop 125 references the output from the error amplifier $OP_1$ for adjusting the duty cycle of the transistor $Q_1$ and then making the output voltage signal $V_{out}$ stabilized at a target level. Further description is well known to those skilled in the art and is therefore not detailed here for brevity. Additionally, the over-current detection circuit 120 comprises an over-current detection device 135, a comparator $OP_2$, and a leading edge blanking device 140. The over-current detection circuit 120 is utilized for performing an over-current detection and outputting an indication signal $S_1$ when detecting that a current $I_1$ passing through the switch device 110 exceeds a predetermined current limit.

Please refer to FIG. 2. FIG. 2 is a waveform diagram illustrating the operation of the prior art flyback DC/DC voltage converter 100 shown in FIG. 1. As shown in FIG. 2, from the voltage converter 100's start time to time $T_1$, the transistor $Q_1$ is turned on and the energy brought by the input voltage signal $V_{in}$ will be stored at the first electronic induction circuit $L_1$. It should be noted that no energy coupling is established between these two electronic induction circuits (coupling inductors or transformer) $L_1$ and $L_2$ due to the reverse biased diode D. Once the transistor Q1 is turned off, i.e. from time $T_1$ to time $T_2$, the energy stored at the first electronic induction circuit $L_1$ will be transferred/coupled into the second electronic induction circuit $L_2$ to output the output voltage signal $V_{out}$ because the diode D is forward biased by the polarity change of the second electronic induction circuit $L_2$ as the first electronic induction circuit $L_1$ changes its polarity. Since the electronic induction device 105 is not ideal, the voltage level at the node $N_1$ (i.e. $V_{N1}$) will have a voltage spike $V_{spike}$ caused by a leakage inductance of the first electronic induction circuit $L_1$, parasitic capacitance of the first electronic induction circuit $L_1$, and output capacitance of the transistor $Q_1$. An equation related to the voltage level at the node $N_1$ (i.e. $V_{N1}$) is shown below:

$$V_{N1} = V_{spike} + V_{in} + \frac{V_{out}}{N} = I_1 \times \sqrt{\frac{L_{leak}}{C_P + C_{oss}}} + V_{in} + \frac{V_{out}}{N}, \quad \text{Equation (1)}$$

wherein N represents a turns ratio of the electronic induction device 105, $L_{leak}$ represents the leakage inductance of the first electronic induction circuit $L_1$, $C_p$ represents the parasitic capacitance of the first electronic induction circuit $L_1$, and $C_{oss}$ represents an output capacitance of the transistor $Q_1$. Assuming that a voltage level of the input voltage signal $V_{in}$ is equal to 3 volts, a voltage level of the output voltage signal $V_{out}$ is designed to provide 24 volts, and the turns ratio N is equal to 8. Equation (1) can be rewritten as below:

$$V_{N1} = V_{spike} + 3 + \frac{24}{8} = V_{spike} + 6, \quad \text{Equation (2)}$$

In order to prevent the transistor $Q_1$ from breakdown, the voltage level $V_{N1}$ must be smaller than the maximum sustainable voltage difference of the transistor $Q_1$. In this example, if the maximum sustainable voltage difference across the transistor $Q_1$ is limited to 20 volts, the voltage spike $V_{spike}$ needs to be smaller than 14 volts; otherwise, the transistor $Q_1$ will be damaged.

In addition, the comparator $OP_2$ compares the voltage difference across the switch device 110 caused by the current $I_1$ and a reference voltage $V_{ref2}$ to determine if the current $I_1$ is larger than a predetermined current limit value. Usually, the predetermined current limit value is set to be smaller than the maximum continuous sustainable current passing through the transistor $Q_1$. For example, if the reference voltage $V_{ref2}$ is equal to 0.8 volts, the impedance of the switch device 110 is equal to 200 micro Ohm, the comparator $OP_2$ will notify the over-current detection device 135 to switch off the transistor $Q_1$ through the control circuit 115 when the voltage difference across the switch device 110 is larger than 0.8 volts (i.e. the current $I_1$ is larger than 4 A). Furthermore, as shown in FIG. 2, when the transistor $Q_1$ is turned on, the current $I_1$ will have large current swing such that the leading edge blanking device 140 is needed to prevent the over-current detection device 135 from false triggered. Usually, the leading edge blanking device 140 built in a leading edge blanking time (probably 300~500 nanoseconds). In the leading edge blanking time, the over-current detection device 135 is disabled.

However, when the voltage converter 100 is operated under an abnormal operating condition, for example, when the first electronic induction circuit $L_1$ is shorted by a short line (note: the short line has small parasitic inductance) and then the converter 100 is enabled, the current $I_1$ will rise very fast and the value will be very high in the leading edge blanking time. In theory the current $I_1$ could be up to 15 A, this is estimated by the voltage level of the input voltage signal Vin (i.e. 3 volts) divided by the impedance of the switch device 110 (i.e. 0.2 Ohm) is equal to 15 A. After the leading edge blanking time is finished, the over-current detection device 135 is started and then the transistor $Q_1$ is turned off such that the energy stored at the short line will transfer to the voltage spike across the transistor $Q_1$, which increases the voltage level at the node $N_1$ (i.e. $V_{N1}$) and this voltage level $V_{N1}$ will be much larger than the voltage level $V_{N1}$ under the normal operating condition. Assuming that the short line has 4 nH parasitic inductance, the output capacitance of the transistor $Q_1$ (i.e. $C_{oss}$) is 200 pF, and the current $I_1$ is up to 8 A in the leading edge blanking time. From Equation (1), the voltage spike under this abnormal operating condition may be larger than 35 volts. Therefore, the transistor $Q_1$ will be damaged since the voltage spike is larger than the maximum sustainable voltage difference of the transistor $Q_1$.

There are two conventional schemes provided for solving the problem caused by the voltage spike under the abnormal condition. The first scheme is to provide a snubber circuit having a resistor and a capacitor in series, and to connect the snubber circuit between the node $N_1$ and ground. The snubber circuit is utilized for preventing the voltage level at the node $N_1$ (i.e. $V_{N1}$) from raising very much immediately such that the effect caused by the voltage spike can be alleviated. However, the capacitor is with several nano Faraday, and the resistor is with several Ohm, thus the scheme will increase cost, PCB board space and decrease the total power conversation efficiency of the voltage converter 100. This is a drawback for applying the voltage converter 100 to mobile products.

Another scheme is to lower the sink driver capacity of the transistor $Q_1$ such that the turn off period of the transistor $Q_1$ becomes longer. The effect caused by the voltage spike can be reduced since the impedance of the transistor $Q_1$ can be used to consume the energy, introduced by the voltage spike during the $Q_1$ turn off period. However, under the normal operating condition, the switching loss is also increased and the power conversion efficiency of the voltage converter 100 is then decreased. Moreover, the switching loss will become more serious for portable products, because portable products usually operate in high switching frequency.

SUMMARY OF THE INVENTION

Therefore one of the objectives of the present invention is to provide a voltage converter and related voltage converting method capable of decreasing the voltage difference across the switch device caused by the voltage spike efficiently, to solve the above problem.

According to a first embodiment of the claimed invention, a voltage converter is disclosed. The voltage converter comprises an electronic induction device, a switch device, a protection circuit, and a control circuit. The switch device electrically connected to the electronic induction device is utilized for selectively establishing an electrical connection between the electronic induction device and a predetermined voltage level according to a first control signal. The protection circuit coupled to the electronic induction device is utilized for selectively establishing an electrical connection between the electronic induction device and the predetermined voltage level, wherein an impedance of the protection circuit is greater than an impedance of the switch device. The control circuit coupled to the switch device is utilized for generating the first control signal.

According to a second embodiment of the claimed invention, another voltage converter is disclosed. The voltage converter comprises an electronic induction device, a switch device, an over-current detection circuit, a control circuit, a driving circuit, and a protection circuit. The switch device electrically connected to the electronic induction device is utilized for selectively establishing an electrical connection between the electronic induction device and a predetermined voltage level according to a first control signal received at a control node thereof. The over-current detection circuit coupled to the electronic induction device is utilized for performing an over-current detection and outputting an indication signal when detecting that a current passing through the switch device exceeds a predetermined current limit. The control circuit is utilized for generating a second control signal. The driving circuit, coupled to the control circuit, the over-current detection circuit, and the control node of the switch device, is utilized for converting the second control signal into the first control signal, wherein the driving circuit is disabled when receiving the indication signal. The protection circuit coupled to the control node of the switch device is utilized for selectively establishing an electrical connection between the control node of the switch device and the predetermined voltage level, wherein the protection circuit is enabled when receiving the indication signal.

These and other objectives of the present invention will no doubt become obvious to those of ordinary skill in the art after reading the following detailed description of the preferred embodiment that is illustrated in the various figures and drawings.

DETAILED DESCRIPTION

Figure 3A:
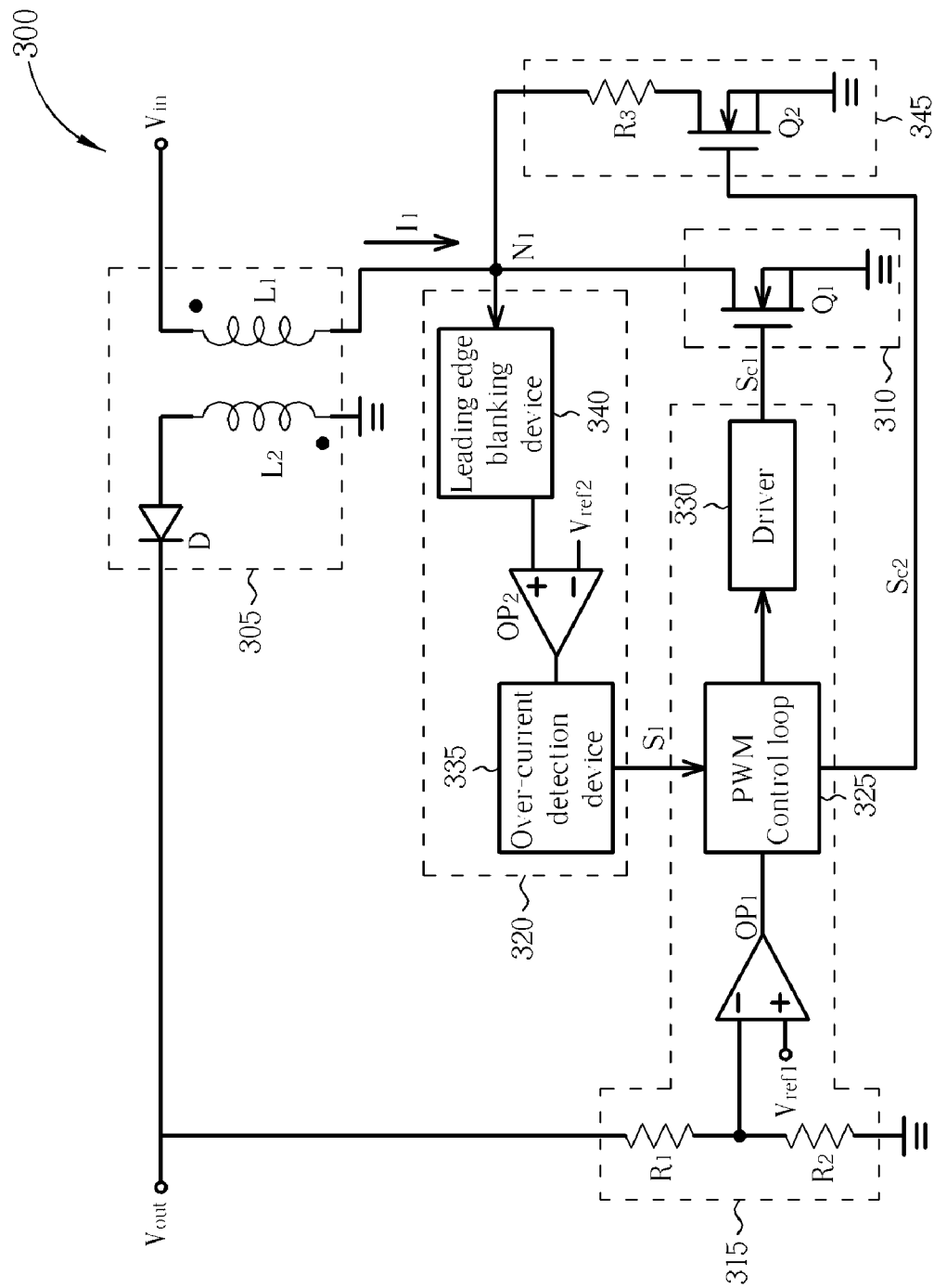
FIG. 3a is a diagram of a voltage converter according to a first embodiment of the present invention.

Please refer to FIG. 3a. FIG. 3a is a diagram of a voltage converter 300 according to a first embodiment of the present invention. As shown in FIG. 3a, the voltage converter 300 comprises an electronic induction device 305, a switch device 310, a control circuit 315, an over-current detection circuit 320, and a protection circuit 345 having a resistor $R_3$ and a transistor $Q_2$. It should be noted that a flyback converter configuration is shown in FIG. 3a as an example used for illustrating features of the present invention. However, this is for illustrative purposes only. In other words, after reading the following description a person skilled in this art can readily realize that the disclosed spike voltage reduction techniques can be applied to other converter implementations, such as a buck converter, a boost converter, or a forward converter.

Figure 1:
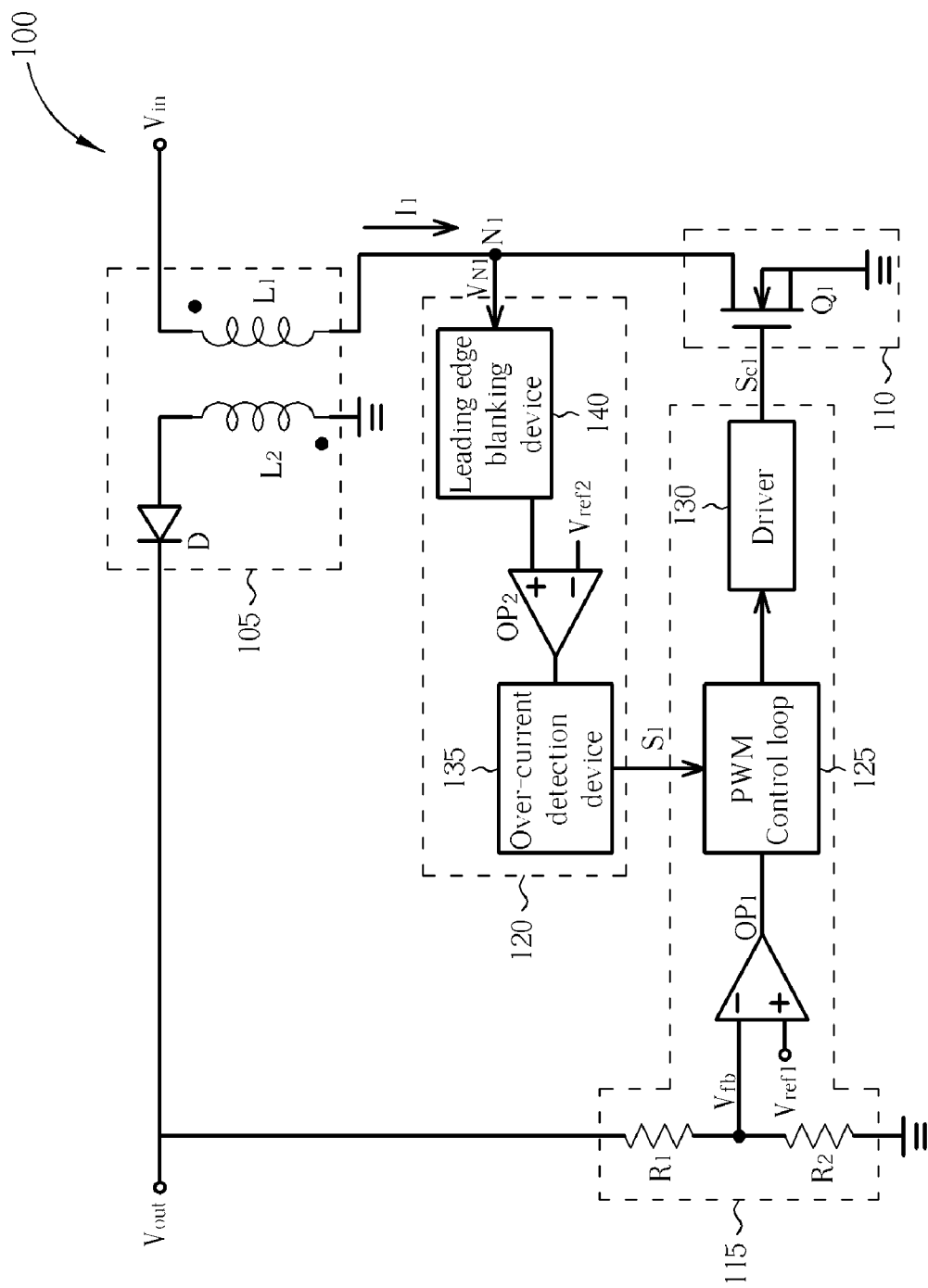
FIG. 1 is a diagram of an example of a prior art flyback DC/DC voltage converter.
Figure 2:
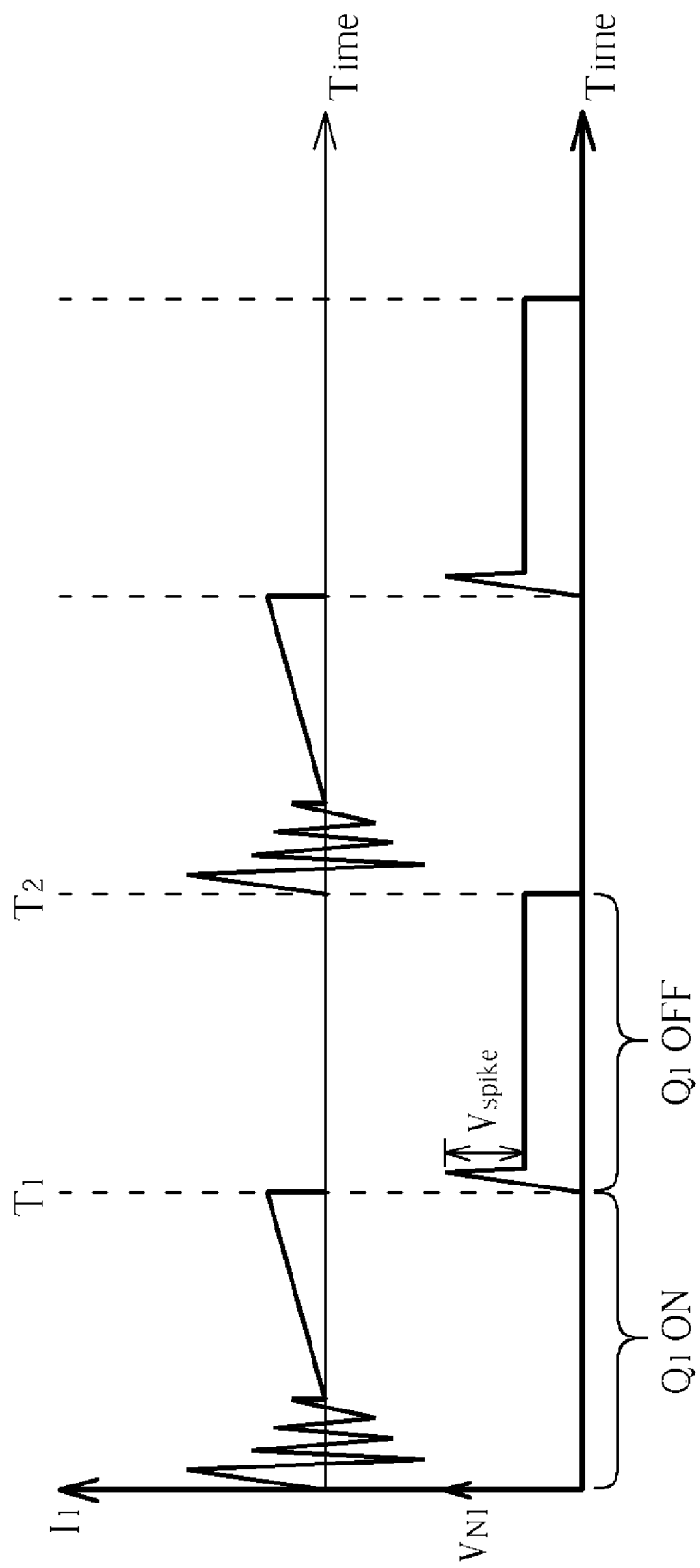
FIG. 2 is a diagram illustrating the operation of the prior art flyback DC/DC voltage converter shown in FIG. 1.

As the operation and function of the electronic induction device 305, the switch device 310, and the over-current detection circuit 320 are identical to those components of the same name shown in FIG. 1 (i.e., the electronic induction device 105, the switch device 110, and the over-current detection circuit 120); further description is not detailed for brevity. The operation and function of the control circuit 315 is similar to that of the control circuit 115 shown in FIG. 1. The major difference between the control circuits 315, 115 is that a PWM control loop 325 in the control circuit 315 will further control the conductance of the transistor $Q_2$, coupled to the transistor $Q_1$ in a parallel fashion, according to an output of the over-current detection device 335. The protection circuit 345 is utilized for selectively establishing an electrical connection between the electronic induction device 305 and a predetermined voltage level (e.g., a ground voltage). In this embodiment, an impedance of the protection circuit 345 is designed to be greater than an impedance of the switch device 310.

Figure 3B:
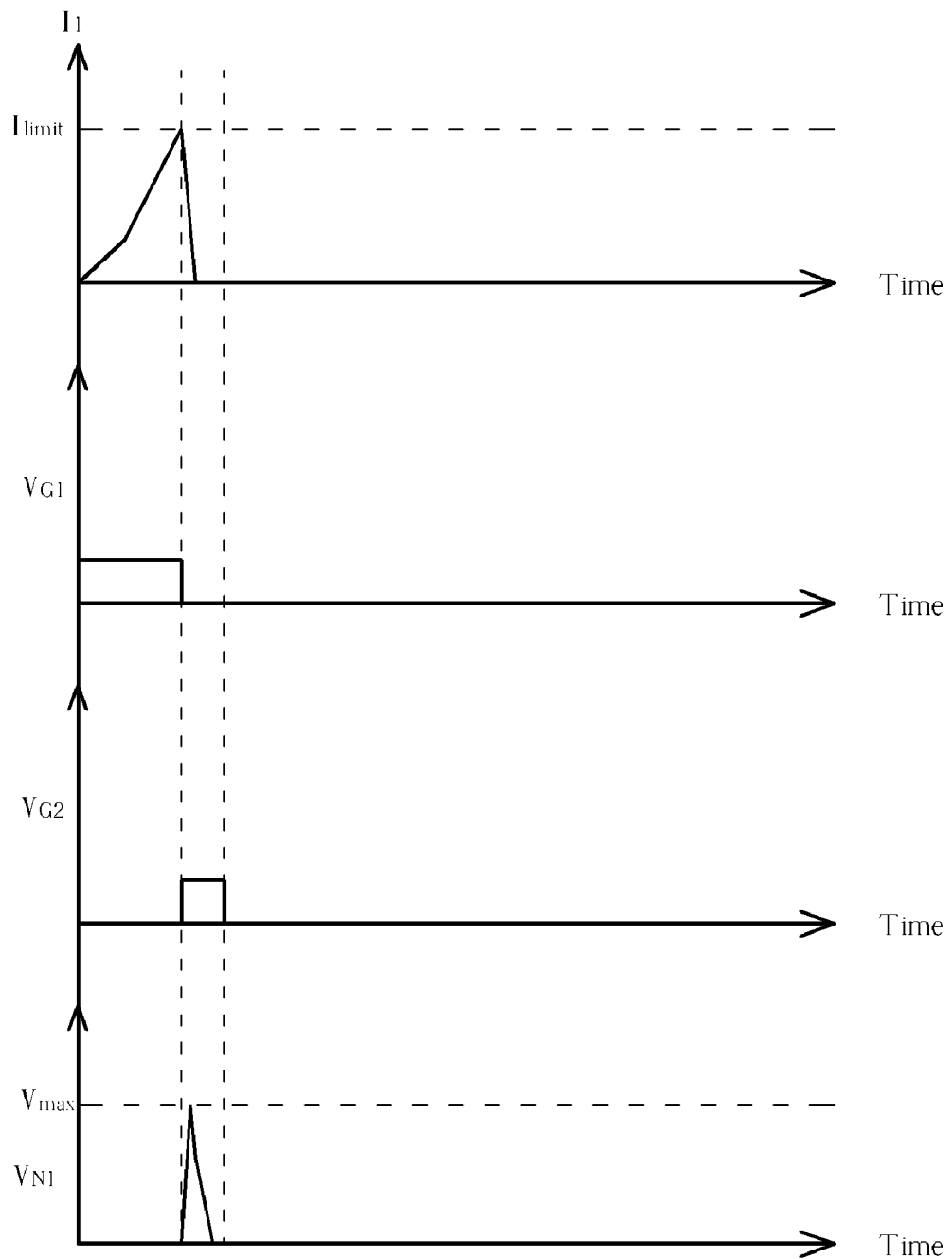
FIG. 3b is a timing diagram illustrating operation of the voltage converter according to the first embodiment of the present invention.

Please refer to FIG. 3b. FIG. 3b is a timing diagram illustrating operation of the voltage converter 300 according to the first embodiment of the present invention. As shown in FIG. 3b, when the voltage converter 300 is enabled and operated under the normal operating condition (i.e. the first electronic induction circuit $L_1$ is not shorted), the transistor $Q_1$ is switched on (i.e. the voltage level at the gate of the transistor $Q_1$ (i.e. $V_{G1}$) becomes high), yet the status of the transistor $Q_2$ still remains off (i.e. the voltage level at the gate of the transistor $Q_2$ (i.e. $V_{G2}$) remains low). At this time the protection circuit 345 does not work under the normal operating condition. Once the current $I_1$ exceeds the predetermined current limit $I_{limit}$, the voltage converter 300 may be operated under the abnormal operating condition and the over-current detection circuit 320 will then notify the PWM control loop 325 by issuing an indication signal $S_1$. Next, in response to the indication signal $S_1$, the PWM control loop 325 generates a second control signal $S_{c2}$ to control the conductance of the transistor $Q_2$ in the protection circuit 345. Therefore, the transistor $Q_2$ is switched on (i.e. at time $T_1$, the voltage level at the gate of the transistor $Q_2$ (i.e. $V_{G2}$) becomes high, yet the voltage level at the gate of the transistor $Q_1$ (i.e. $V_{G1}$) becomes low). The transient voltage difference across the transistor $Q_1$ caused by the above-mentioned voltage spike will be decreased through the enabled transistor $Q_2$ and the resistor $R_3$. After most of the energy introduced by the voltage spike has been consumed through the protection circuit 345, i.e., the voltage difference across the transistor $Q_1$ (i.e. $V_{N1}$) is not larger than the maximum sustainable voltage difference across the transistor $Q_1$ (i.e. $V_{max}$), then the transistor $Q_2$ will be switched off (i.e. time $T_2$). In the present invention, the time when the transistor $Q_2$ is switched off is controlled by the PWM control loop 325, and could be programmed depending upon different design requirements. Additionally, the spike voltage reduction scheme shown in FIG. 3a can be easily implemented, and is allowed to be integrated in an IC without occupying large chip area.

Moreover, any design of the time when the transistor $Q_2$ is switched off is suitable for the present invention only if it can keep the transistor $Q_1$ from being damaged by high voltage. Please note that, in another embodiment, the resistor $R_3$ can be removed if the impedance of the transistor $Q_2$ is high enough to keep the transistor $Q_1$ from spike voltage damage.

In other embodiments, when the voltage converter 300 is enabled, the transistor $Q_2$ will also be switched on. That is to say, the protection circuit 345 always operates whether the current $I_1$ exceeds the predetermined current limit or not. Compared with the transistor $Q_1$, the impedance of the transistor $Q_2$ in such an embodiment is much higher than that of the transistor $Q_1$, allowing most of the current $I_1$ to pass through the switch device 310. As a result, the transistor $Q_2$ therefore does not impede the normal operation of the voltage converter 300 even if it is always conductive after the voltage converter 300 is enabled. The same objective of alleviating the effect caused by the undesired spike voltage is achieved.

Figure 4:
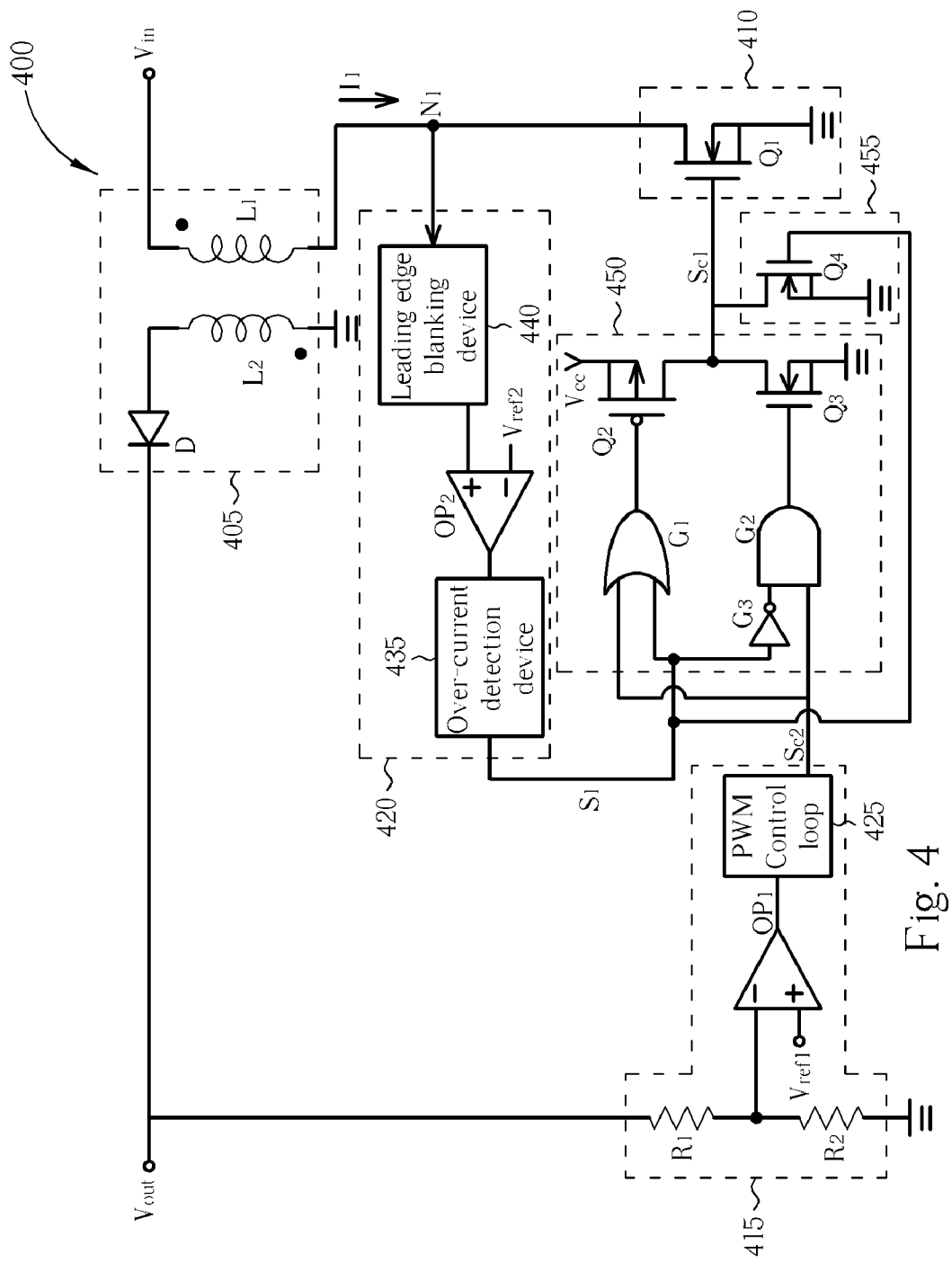
FIG. 4 is a diagram of a voltage converter according to a second embodiment of the present invention.

Please refer to FIG. 4. FIG. 4 is a diagram of a voltage converter 400 according to a second embodiment of the present invention. As shown in FIG. 4, the voltage converter 400 comprises an electronic induction device 405, a switch device 410, a control circuit 415, an over-current detection circuit 420, a driving circuit 450, and a protection circuit 455. Similarly, please note that a flyback converter configuration is shown in FIG. 4 as an example used for illustrating features of the present invention. However, this is for illustrative purposes only. In other words, after reading the following description a person skilled in this art can readily realize that the disclosed spike voltage reduction techniques can be applied to other converter implementations, such as a buck converter, a boost converter, or a forward converter.

As the operation and function of the electronic induction device 405, the switch device 410, and the over-current detection circuit 420 is the same as the components of the same name shown in FIG. 1 (i.e., the electronic induction device 105, the switch device 110, and the over-current detection circuit 120); further description is not detailed for brevity. The operation and function of the control circuit 415 is similar to that of the control circuit 115 shown in FIG. 1, but a major difference between the control circuits 115, 415 is that the control circuit 415 does not comprise a driver but the operation and function of the driver is replaced by an improved driving circuit 450 connected thereto. As shown in FIG. 4, the driving circuit 450 comprises a plurality of transistors $Q_2$, $Q_3$, an OR gate $G_1$, an AND gate $G_2$, and an inverter $G_3$. The driving circuit 450 is utilized for converting a second control signal $S_{c2}$ generated from the control circuit 415 into a first control signal $S_{c1}$ used for switching on or switching off the transistor $Q_1$. In this embodiment, the protection circuit 455 comprising a transistor $Q_4$ is utilized for selectively establishing an electrical connection between the control node of the switch device 410 and the ground. Assume that the over-current detection circuit 420 outputs an indication signal $S_1$ having a high logic level '1' when detecting that a current $I_1$ passing through the switch device 410 exceeds a predetermined current limit, otherwise, the output of the over-current detection circuit 420 remains a low logic level "0" when detecting that the current $I_1$ passing through the switch device 410 does not exceed the predetermined current limit.

When the voltage converter 400 is operated under the normal operating condition and the current $I_1$ does not exceed the predetermined current limit (i.e. the output of the over-current detection circuit 420 remains a low logic level '0' at this time), the status of the transistor $Q_4$ in the protection circuit 455 remains off and the transistors $Q_2$, $Q_3$ are controlled by the output of the control circuit 415. Generally speaking, the combination of transistors $Q_2$, $Q_3$ can serve as the driver 130 in the control circuit 115. However, in other embodiments of the present invention, other driving circuit configurations are possible. The circuit architecture shown in FIG. 4 is for illustrative purposes only.

The over-current detection circuit 420 generates the indication signal $S_1$ when the current $I_1$ exceeds the predetermined current limit. The transistor $Q_4$ in the protection circuit 455 will be switched on and the transistors $Q_2$, $Q_3$ will be switched off (i.e. the driving circuit 450 is disabled when receiving the indication signal $S_1$). In this case, the gate falling time of the transistor $Q_1$ is determined by the product of the impedance of the transistor $Q_4$ and the input capacitance of the transistor $Q_1$. Usually, the impedance of the transistor $Q_4$ is designed to be smaller than one of the transistor $Q_3$ to increase the gate falling time of the transistor $Q_1$. That is to say, the gate falling time of the transistor $Q_1$ under the normal operating condition is not influenced by the protection circuit 455, but it will be increased when the current $I_1$ exceeds the predetermined current limit. Therefore, by means of controlling the gate falling time of the transistor $Q_1$ dynamically, the effect caused by the voltage spike will be alleviated since the energy introduced by the voltage spike can be consumed through longer turn off time of the transistor $Q_1$. Please note that, any design of the driving circuit 450 utilized for controlling the gate falling time of the transistor $Q_1$ dynamically is also suitable for the present invention. Additionally, the spike voltage reduction scheme shown in FIG. 4 can be easily implemented, and can be integrated into an IC without occupying large chip area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage converter, comprising:
   an electronic induction device;
   a switch device, electrically connected to the electronic induction device, for selectively establishing an electrical connection between the electronic induction device and a predetermined voltage level according to a first control signal received at a control node thereof;
   an over-current detection circuit, coupled to the electronic induction device, for performing an over-current detection and outputting an indication signal when detecting that a current passing through the switch device exceeds a predetermined current limit;
   a control circuit, for generating a second control signal;
   a driving circuit, coupled to the control circuit, the over-current detection circuit, and the control node of the switch device, for converting the second control signal into the first control signal, wherein the driving circuit is disabled when receiving the indication signal; and
   a protection circuit, coupled to the control node of the switch device, for selectively establishing an electrical connection between the control node of the switch device and the predetermined voltage level, wherein the protection circuit is enabled when receiving the indication signal.

2. The voltage converter of claim 1, wherein the voltage converter is a flyback converter, a buck converter, a boost converter, or a forward converter.

3. The voltage converter of claim 1, wherein the protection circuit comprises:
   a transistor having a first node coupled to the control node of the switch device, a second node coupled to the predetermined voltage level, and a control node coupled to the over-current detection circuit for receiving the indication signal.

4. A voltage converter, comprising:
   an electronic induction device;
   a switch device, electronically connected to the electronic induction device, for selectively establishing an electrical connection between the electronic induction device and a predetermined voltage level;
   an over-current detection circuit, coupled to the electronic induction device, for performing an over-current detection and outputting an indication signal when detecting that a current passing through the switch device exceeds a predetermined current limit;
   a driving circuit, for switching on or off the switch device; and
   a protection circuit, coupled to the over-current detection circuit and the switch device, wherein when the over-current detection circuit asserts an over-current event, the over-current detection outputs the indication signal and signals the protection circuit to protect the switch device from spike voltage damage;
   wherein the protection circuit will not be enabled if the over-current detection circuit does not assert the over-current event.

5. The voltage converter of claim 4, wherein the protection circuit comprises a transistor with a control terminal coupled to the over-detection circuit.

6. The voltage converter of claim 5, wherein the transistor is connected in parallel with the switch device to receive part of the current through the electronic induction device.

7. The voltage converter of claim 5, wherein when the over-current circuit asserts an over-current event, the driving circuit turns off the switch device and the transistor is turned on for a period of time.

8. The voltage converter of claim 5, wherein when the over-current detection circuit asserts an over-current event, the driving circuit is disabled and the transistor is turned on to render the switch device turned off.

* * * * *